United States Patent
McKinley et al.

(10) Patent No.: US 6,676,026 B1
(45) Date of Patent: Jan. 13, 2004

(54) SYSTEM AND METHOD FOR AUTONOMIC ENVIRONMENTAL MONITORING, ADJUSTING, AND REPORTING CAPABILITY IN A REMOTE DATA STORAGE AND RETRIEVAL DEVICE

(75) Inventors: Wayne Alan McKinley, Tucson, AZ (US); Lee Curtis Randall, Tucson, AZ (US); Daniel James Winarski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/214,236

(22) Filed: Aug. 7, 2002

(51) Int. Cl.[7] .................................................. F24F 7/00
(52) U.S. Cl. .................. 236/49.3; 236/91 C; 165/80.3; 361/695; 454/184
(58) Field of Search .............................. 236/49.3, 91 R, 236/91 A, 91 C, 91 E, 91 F, 44 C, 94; 62/259.2; 165/223, 224, 80.2, 80.3, 11.1, 104.33; 454/184, 239, 229; 361/690, 694, 695, 697, 696

(56) References Cited

U.S. PATENT DOCUMENTS

| | | | |
|---|---|---|---|
| 4,500,944 A | 2/1985 | Roberts et al. | |
| 4,685,303 A | 8/1987 | Branc et al. | |
| 4,860,143 A | 8/1989 | van Blerk | |
| 5,434,737 A | 7/1995 | Miura | |
| 5,471,099 A | 11/1995 | Larabell et al. | |
| 5,586,250 A | 12/1996 | Carbonneau et al. | |
| 5,875,965 A | 3/1999 | Lee | |
| 5,906,315 A | * 5/1999 | Lewis et al. | 236/49.3 |
| 6,319,114 B1 | * 11/2001 | Nair et al. | 454/184 |

FOREIGN PATENT DOCUMENTS

| | | |
|---|---|---|
| JP | 56101675 | 8/1981 |

\* cited by examiner

Primary Examiner—Harry B. Tanner
(74) Attorney, Agent, or Firm—Jean M. Barkley; Bracewell & Patterson, L.L.P.

(57) ABSTRACT

A data storage and retrieval system such as a robotic library has a large plurality of removable storage media, such as tape cartridges, for purposes of I/O. To enhance performance and reliability of the library, a thermodynamic model of the library is constructed and stored in the library, and environmental conditions such as the temperature, humidity, and flow rate of cooling air coming into, flowing through, and leaving the library are monitored. The thermodynamic model of the library includes an acceptable operating range for the library in a psychrometric chart; and the product of the effective thermodynamic mass and specific heat of the library.

28 Claims, 7 Drawing Sheets

SYSTEM AND METHOD FOR AUTONOMIC ENVIRONMENTAL MONITORING, ADJUSTING, AND REPORTING CAPABILITY IN A REMOTE DATA STORAGE AND RETRIEVAL DEVICE

BACKGROUND OF THE INVENTION

1. Technical Field

The present invention relates in general to an improved data storage device, and in particular to an improved data storage device with the capability of monitoring environmental conditions, such as temperature and humidity, adjusting system operating parameters, and notifying remote parties with respect to such conditions.

2. Description of the Prior Art

Data recording devices, such as tape drives, write information to and read information from a data storage device, such as the data tape of a tape cartridge. As the performance requirements of tape drives has continued to increase, the tape heads used to read data from and write data to the tape have become more susceptible to damage during operation at elevated temperatures and relative humidity levels. Although the tape and tape drives are typically designed to operate in such conditions, a majority of users never operate their equipment in extreme environments. However, the mechanical properties of tape and tape drives can change dramatically at elevated temperature and humidity.

For example, the tape heads can damage the tape if the "local" ambient conditions, such as temperature and relative humidity, of the environment surrounding the tape drive increases. Moreover, the large size of some tape drives causes the local environmental conditions within each tape drive to be out of specification, even though the "global" or "overall" environmental conditions are actually within specification. This can create a significant field problem since adverse environmental conditions can accelerate the corrosion of tape heads. Corroded tape heads must be replaced and, because of their significant cost, such a maintenance operation can be very expensive. Thus, an improved apparatus and method for adapting a data recording device to changes in environmental conditions in order to reduce the risk of damage to the storage media and drives is needed.

SUMMARY OF THE INVENTION

One embodiment of a data storage and retrieval system comprises a robotic library having a large plurality of removable storage media, such as tape cartridges, for purposes of input and output. To enhance performance and reliability of the library, (a) a thermodynamic model of the library is constructed and stored in the library; and (b) environmental conditions such as the temperature, humidity, and flow rate of cooling air coming into, flowing through, and leaving the library are monitored. The thermodynamic model of the library includes an acceptable operating range for the library within a psychrometric chart; and the product of the effective thermodynamic mass and specific heat of the library.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PRESENT INVENTION

Figure 1:
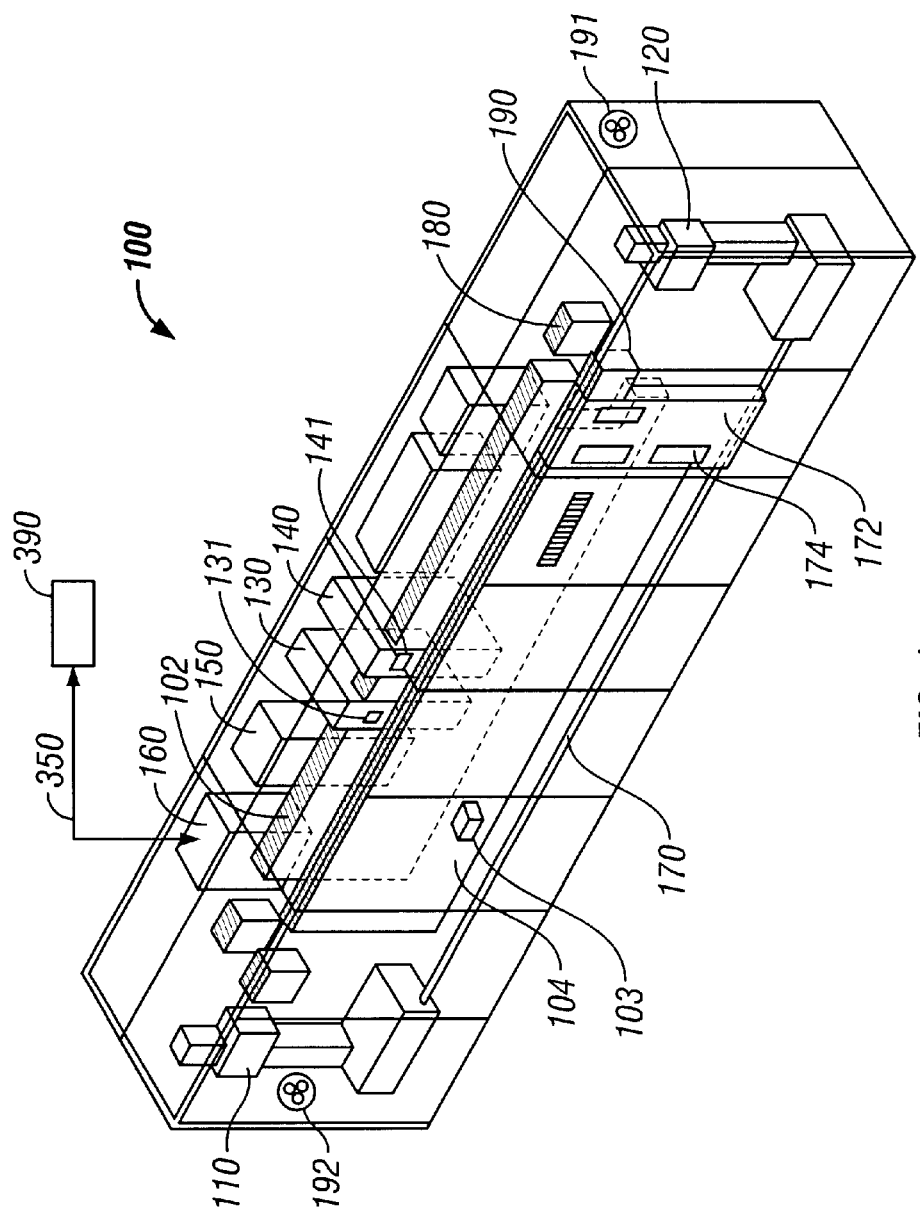
FIG. 1 is an isometric view of one embodiment of a data storage and retrieval system constructed in accordance with the present invention.

Referring to FIG. 1, a data storage and retrieval system 100 is shown. In the embodiment illustrated, data storage and retrieval system 100 is depicted as a robotic library. However, data storage and retrieval system 100 also may comprise other systems as well, such as a Network Attached Storage (NAS) subsystem of one or more Redundant Array of Independent Disks (RAID).

Figure 3:
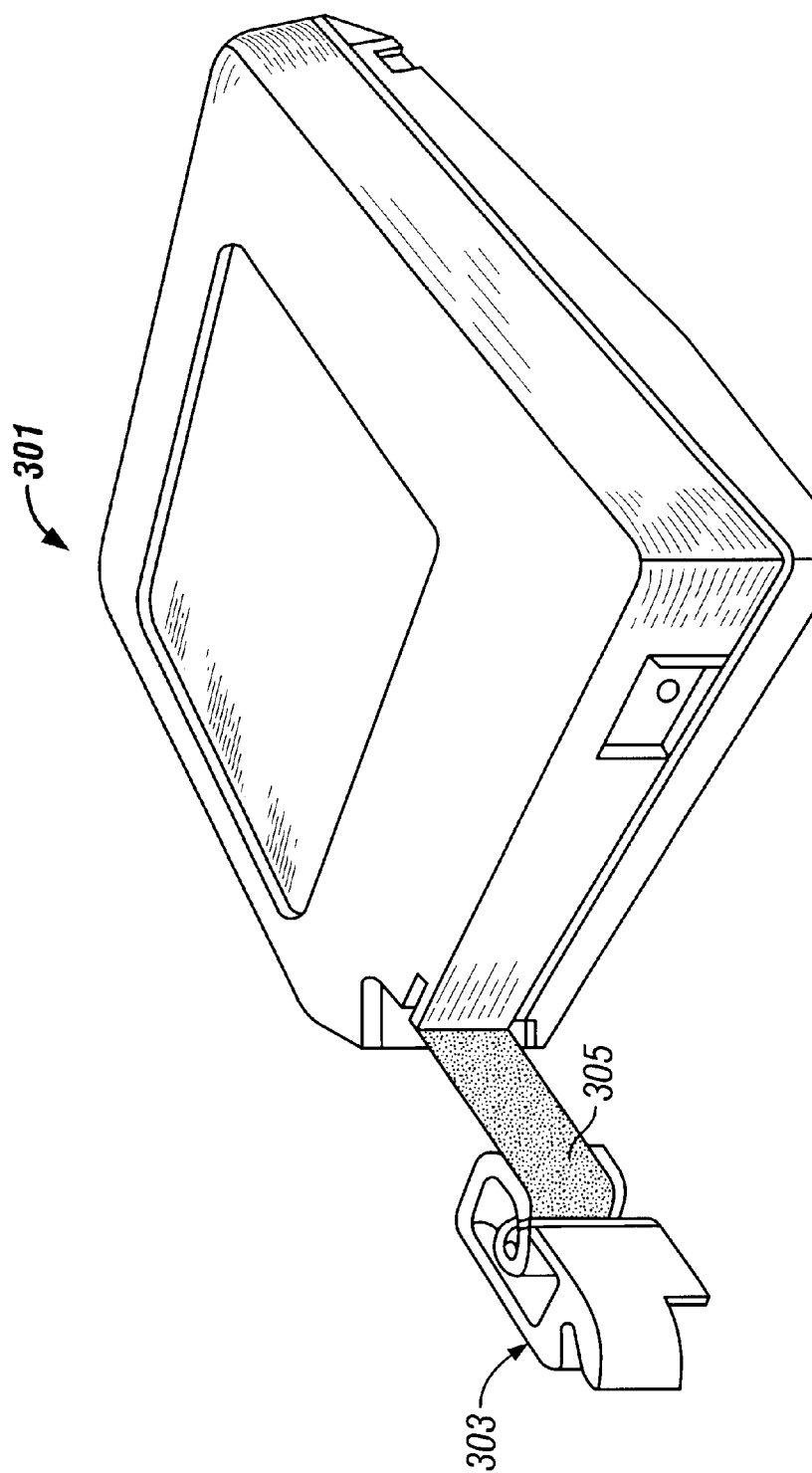
FIG. 3 is an isometric view of a removable tape cartridge used in conjunction with the tape drive of FIG. 2.

The upper interface of controller 160 allows data storage and retrieval system 100 to communicate with one or more hosts 390 via link 350. Link 350 may be a Gigabit Ethernet, Infiniband, TCP/IP, Fibre Channel, SCSI, ESCON, FICON, or the like, depending on the application. The lower interface of controller 160 communicates with a plurality of drives that are in drive enclosures 130 and 140. Drive enclosures 130 and 140 receive removable media cartridges 103, which are shown in detail in FIG. 3 as tape media cartridges 301, via robotic pickers 110 and 120. The removable media cartridges 103 may contain magnetic tape, optical tape, optical disk media, magneto-optical disk, CD, DVD, phase-change media, floppy disk, removable hard disk, and the like. Robotic pickers 110 and 120 travel along rail 170 to move removable media cartridges 103 and 301 from inner storage wall 102 and outer storage wall 104 to drive enclosures 130 and 140 for the purposes of input and output (I/O). Robotic pickers 110 and 120 also return the removable media cartridges 103 and 301 to storage walls 102 and 104 when the I/O is concluded.

Import/export station 172 includes access door 174 attached to the side of data storage and retrieval system 100. Access door 174 is preferably pivotally attached to the side of data storage and retrieval system 100; however, access door 174 could be slidably or otherwise attached.

Operator access station 150 permits a user to communicate directly with data storage and retrieval system 100. First power component 180 and second power component 190 each comprise one or more power supplies that supply power to pickers 110 and 120, controller 160, operator access station 150, drive enclosures 130 and 140, and cooling fans 191 and 192 of data storage and retrieval system 100. Typically, at least one of the power components 180 and 190 provides direct current (DC) power, since most computer peripheral devices use DC power. One of the power components 180 and 190 may provide alternating current (AC) power as well. Controller 160 is in communication with cooling fans 191 and 192, power components 180 and 190, as well as pickers 110 and 120, controller 160, operator access station 150, drive enclosures 130 and 140, and tape drive (see FIG. 2) of data storage and retrieval system 100.

Cooling fan 191 typically draws ambient air into data storage and retrieval system 100, while cooling fan 192 typically draws air out of data storage and retrieval system 100. In this way, ventilation or cooling air is circulated through the data storage and retrieval system 100 in order to remove the heat dissipated by the various electrical components of data storage and retrieval system 100, such as pickers 110 and 120, controller 160, operator access station 150, drive enclosures 130 and 140, and cooling fans 191 and 192.

Data storage and retrieval system 100 is also equipped with environmental sensing devices, such as temperature and humidity sensors. In one embodiment, such sensors are located adjacent to cooling fans 191 and 192 to measure the environmental conditions of the air passing through them. The flow rate of air through fans 191 and 192 is known, based on the diameter of the fan blade and the rotational speed of the fan motor. The heat generated by the various electrical components of data storage and retrieval system 100 is typically a known factor of the square of the electrical current times the resistance (I2R) of the individual components. Thus, the total heat generated is the sum of the I2R throughout data storage and retrieval system 100.

Alternatively, power may be monitored by the controller 160 by detecting the electrical voltage-current (VI) product of the power supplies 180, 190, rather than summing the I2R components from the individual tape drives and pickers 110, 120. Power is simply the arithmetic product of V*I for DC electricity. Power is V(rms)*I(rms)*power_factor for AC electricity, where rms stands for root mean square, and power_factor is the cosine of the difference in phase-angle between the AC voltage and the AC current. Since the power_factor involves the cosine trigonometric function of a constant phase angle difference, the power_factor has a constant value for a given AC power supply and that constant value has an absolute value less than or equal to unity. In equations 2 and 3, the term VI will be used to represent both DC and AC power. This method of determining the power output is readily ascertainable via direct measurement, and there is no need to determine the effective resistances of each tape drive and picker, as is the case for I2R calculations. The controller 160 samples VI from each power supply 180, 190, as well as monitoring the temperature and humidity of the incoming and outgoing air flow through cooling fans 191, 192.

Figure 2:
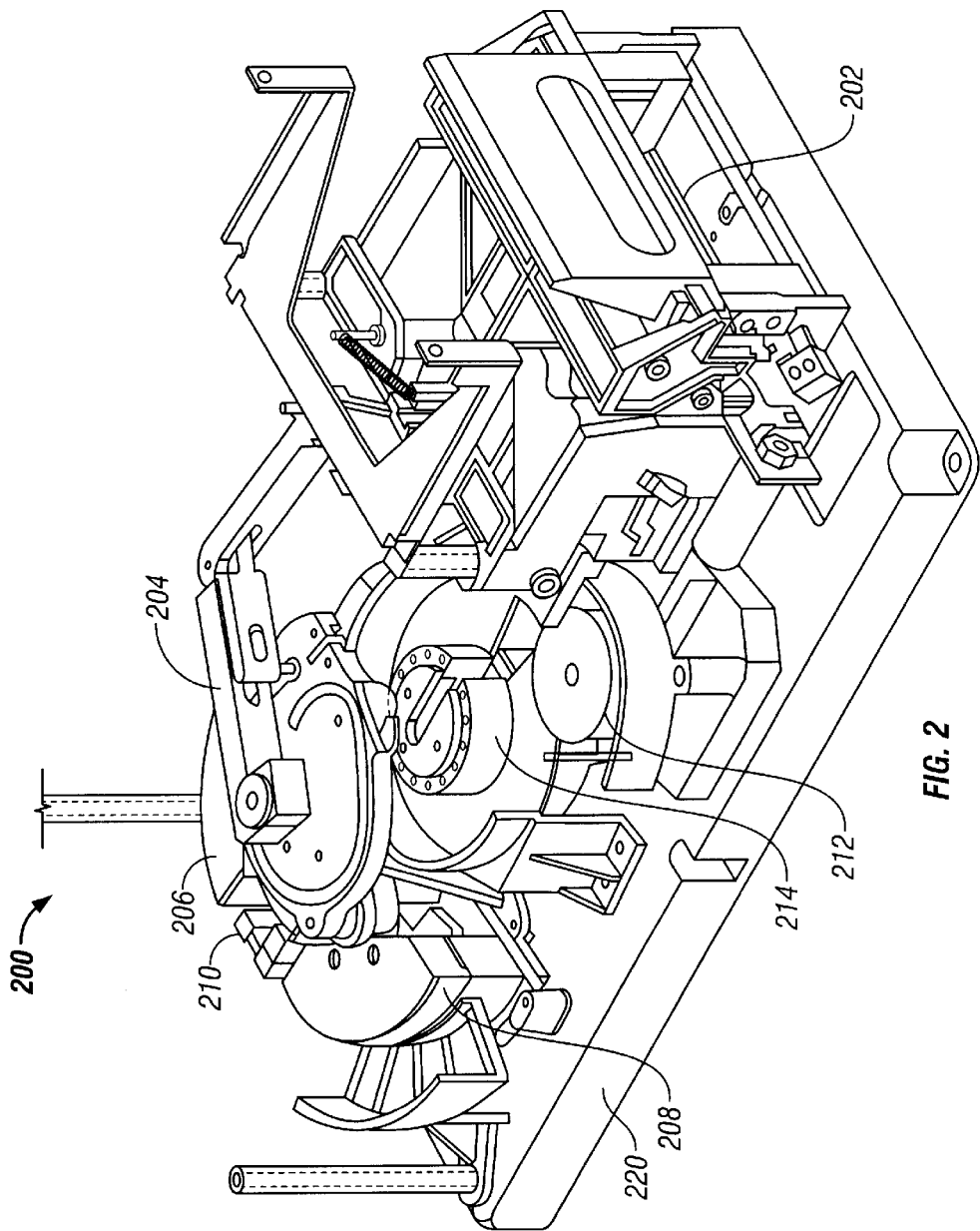
FIG. 2 is an isometric view of a tape drive utilized by the data storage and retrieval system of FIG. 1.

Referring now to FIG. 2, a typical reel-to-reel tape drive 200 is shown. Tape drive 200 is usually located inside of the robotic library 100 of FIG. 1. Tape drive 200 may be any one of, for example, a family of tape drives using a single-reel tape cartridge, such as the IBM 3480, IBM 3490, IBM 3590, and Linear Tape Open (LTO) tape drives. Cartridge loader 202 receives a single-reel tape cartridge 301 (see FIG. 3) and threader 204 threads the leader-block 303 of the tape 305 around the tape guides 206 and 208, and around the tape tension transducer 212, and into the take-up reel 214. Tape guides 206 and 208 support the tape as the tape flies over the magnetic tape head 210. All of these components are supported by base plate 220. One of more tape drives 200 are located inside drive enclosures 130, 140 in order to protect the tape drives 200 from dust and debris, we well as extraneous air currents that could disturb the way the magnetic tape 305 passes over the magnetic head 210.

Figure 4:
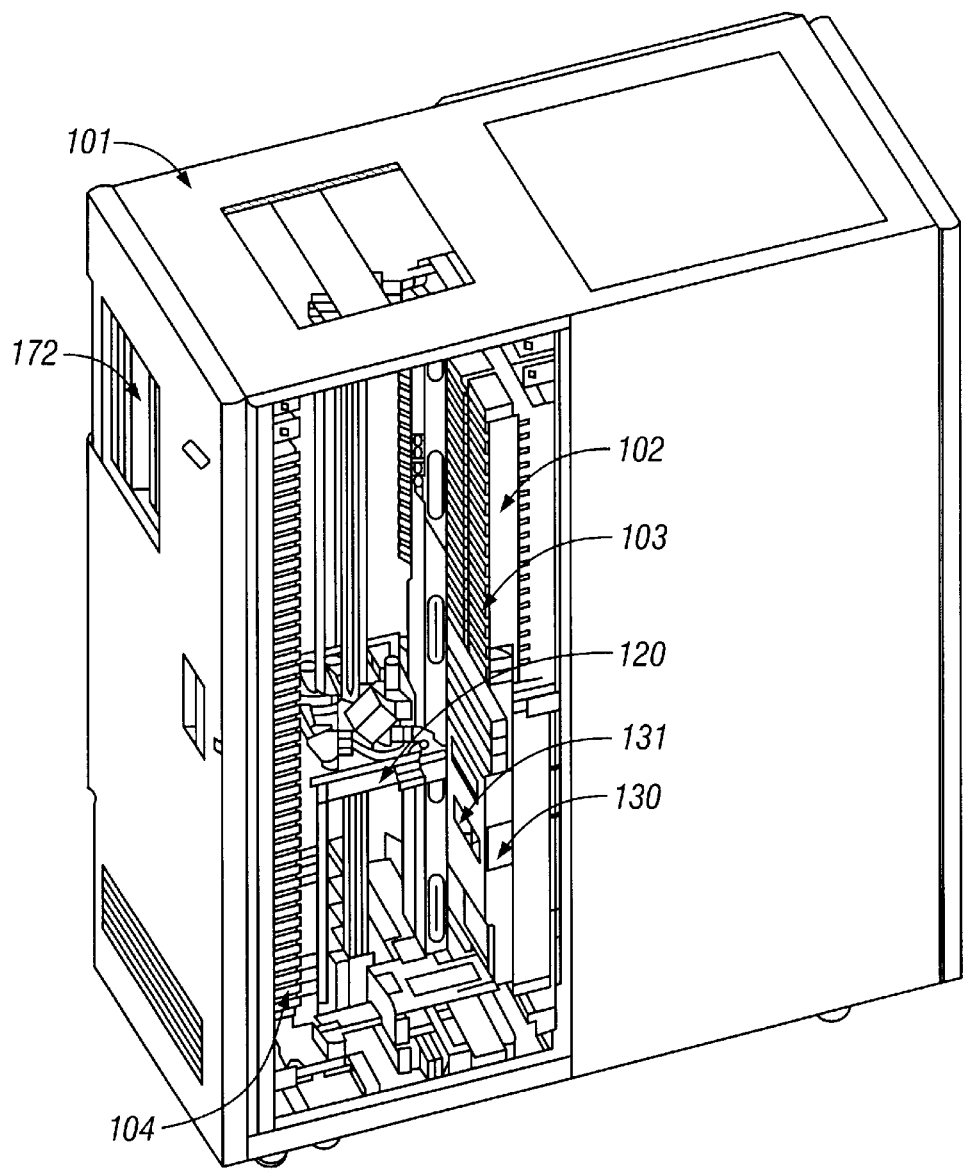
FIG. 4 is an isometric view of a storage module utilized by the data storage and retrieval system of FIG. 1.

The data storage and retrieval system 100 of FIG. 1 is typically assembled from a series of storage modules 101 (FIG. 4). The desired number of storage modules 101 are assembled into data storage and retrieval system 100. Storage module 101 has a picker 120, a drive enclosure 130, an inner storage wall 102, and an outer storage wall 104. A plurality of removable storage media 103 are located in each storage wall 102, 104. Removable storage media 103 are typically tape cartridges 301 (FIG. 3), but may also be other types of media such as those described above. Removable storage media 103 are inserted via robotic pickers 110, 120 into drive enclosure 130 via entrance 131, where removable storage media 103 are mounted on the drive inside, such as tape drive 200 (FIG. 2). As shown in FIG. 1, drive enclosure 140 has entrance 141.

Figure 5:
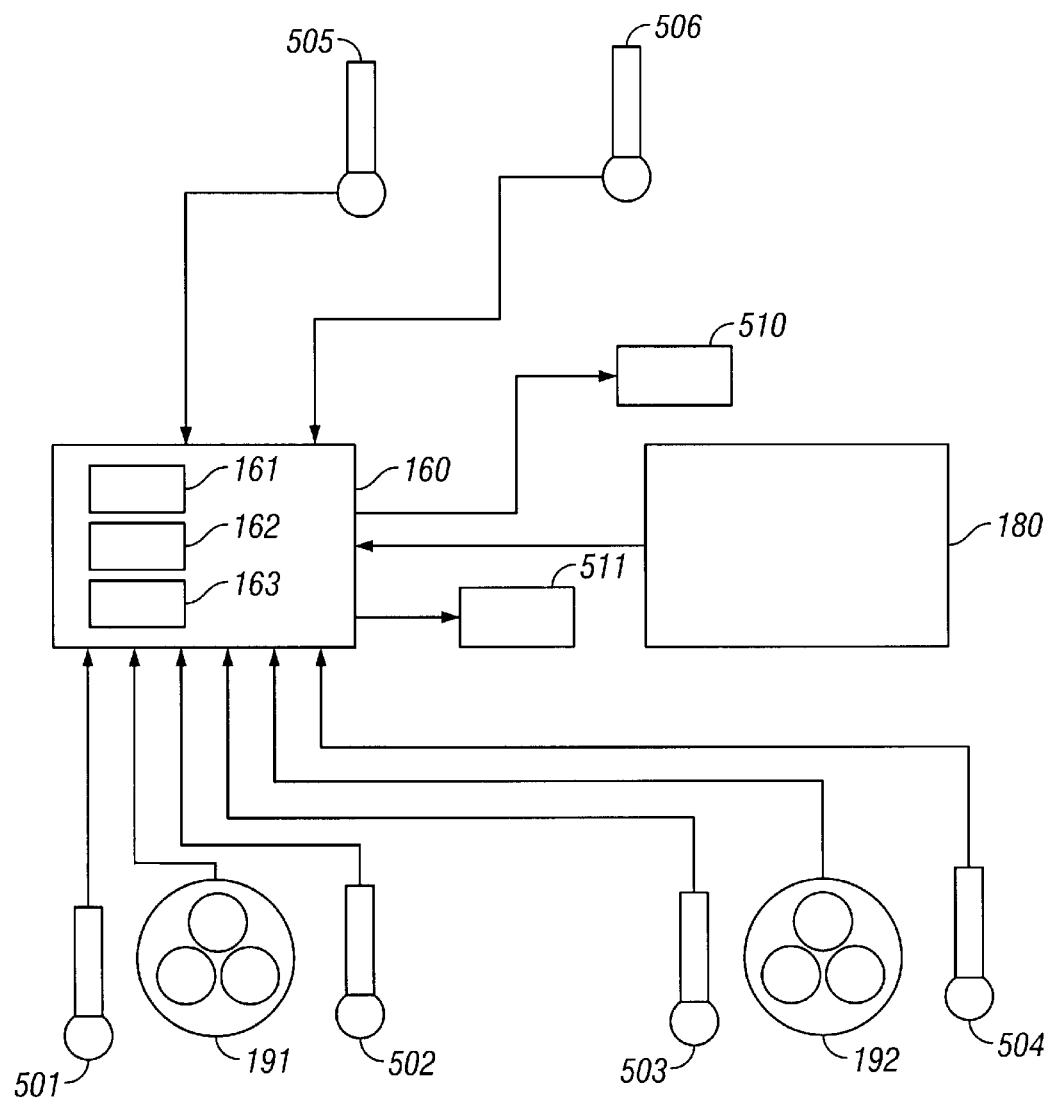
FIG. 5 is a diagram of one embodiment of data acquisition circuitry for the data storage and retrieval system of FIG. 1.

FIG. 5 is a diagram of one embodiment of the environmental data-acquisition circuitry for the data storage and retrieval system 100. Controller 160 has microprocessor 161 for performing calculations. Information pertaining to the psychrometric chart 600 (FIG. 6) and an algorithm for the invention (FIG. 7) are stored in an information bearing medium, such as ROM 162. ROM 162 may comprise, for example, a semiconductor chip (e.g., an EEPROM), to allow for updates to the stored information. Controller 160 also has RAM 163, for the storage of thermodynamic input. Such input comes from thermometer 501 and hygrometer 502, which sample the temperature and humidity, respectively, of the air coming into system 100 through input cooling fan 191. Controller 160 also monitors the rotational speed of fan 191, as well as that of fan 192. Thus, the air flow rate is known and, from a failure standpoint, whether the fans are working at all. Additional input comes from thermometer 503 and hygrometer 504, which sample the temperature and humidity, respectively, of the air going out through output cooling fan 192. Still further input comes from thermometer 505 and hygrometer 506, which sample the temperature and humidity, respectively, within at least one section of the data storage and retrieval system 100 itself. In addition, controller 160 samples the voltage-current (VI) product of power supply 180 and all other power supplies, such as power supply 190, which is shown in FIG. 1.

Data storage and retrieval system 100 also is equipped with a humidifier 510 and a dehumidifier 511, each of which is controlled by controller 160. Humidifier 510 is provided to humidify cold, dry cooling air as data storage and retrieval system 100 is warmed by the heat generated within data storage and retrieval system 100, as discussed below for block 712 of FIG. 7. Similarly, hot and wet air can be dehumidified by dehumidifier 511 if data storage and retrieval system 100 is being cooled, as discussed below for block 710 of FIG. 7.

Some tape libraries, such as the IBM 3584 Anaconda™, are so large that they literally have their own internal weather environment. In order to enhance performance and reliability of such a library, the following elements of the invention are proposed: (a) a thermodynamic model of the library; (b) the monitoring of the temperature, humidity, and flow rate of the incoming cooling air; (c) the monitoring of the temperature, humidity, and flow rate of the outgoing cooling air; and (d) the monitoring of the temperature and humidity of the internal air of the library itself. The thermodynamic model of the library may include (a1) a psychrometric chart that defines an operating region of the library; and (a2) the product of the effective thermodynamic mass and specific heat of the library. In its most simple form, the thermodynamic equation that would govern the use of the library is Equation 1:

$$\text{Heat input} - \text{heat output} = \text{heat accumulation} \quad (\text{Eqn.1})$$

Equation 1 may be expanded into Equation 2 by including the heat content of the incoming cooling air, the VI (or, alternatively, the sum of the I-squared-R (SI2R)) heat generated by the electrical operation of the library's drives and pickers, the heat content of the outgoing cooling air, the effective thermodynamic mass M and specific heat C of the library, and the shift in internal dry bulb temperature of the library (T2−T1) over a period of time (t2−t1).

$$[\text{Incoming heat content} + VI - \text{outgoing heat content}]*(t2-t1) = M*C*(T2-T1) \quad (\text{Eqn.2})$$

The product of M*C used in Equation 2 is evaluated by application of Equation 2 itself, under controlled circumstances. In its simplest form (no airflow), a known amount of power is input for a short period of time such that the temperature increases. As a result, M*C=VI*(t2−t1)/(T2−T1). If the actual mass of the library is used, the actual specific heat C of the library is determined. It is not necessary to solve for M and C individually since only their product is needed. The calibration of M*C may be done on a one-time basis at the manufacturer, or by the library itself at the user's site on a periodic basis. If the library monitors its M*C product (which may be required as drives and cartridges are added to the library), then the library periodically applies Equation 2 as done for the one-time calibration in manufacturing.

The monitoring of the temperature of the air of the library itself would give dry bulb temperature T1 at time t1. Thus, the Equation 2 model predicts future dry bulb temperature T2 of the library at time t2 via Equation 3, based on the amount of cooling and the internal heat generated by the library:

$$T2=T1+[\text{incoming heat content} + VI - \text{outgoing heat content}]*(t2-t1)/[M*C] \quad (\text{Eqn.3})$$

Figure 6:
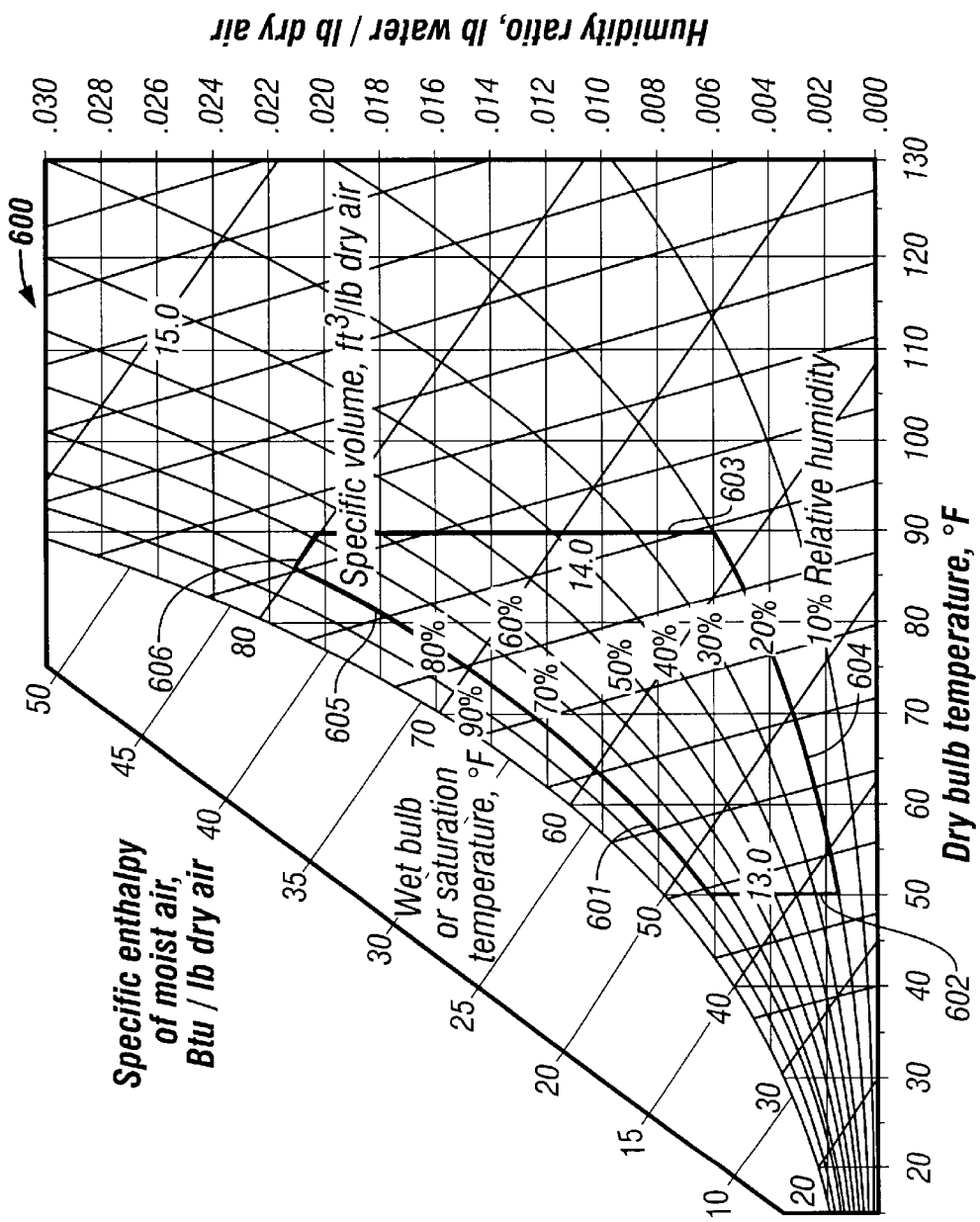
FIG. 6 is a psychrometric chart for 1 atm of atmospheric pressure.

If dry bulb temperature T2 is expected to violate the high temperature of operating limits 601 of the library, as defined by region 601 in the psychrometric chart of FIG. 6, then user-predefined options are automatically implemented, such as (a) increasing the cooling rate of the library's fans by increasing the rotational speed, or by engaging supplemental cooling fans; or (b) reducing the electrical heat generated within the library by reducing the mounts per hour of the picker, or reducing the permitted I/O data rate of the drives within the library. Thus, the library anticipates changes in environmental conditions and is controlled by keeping it on a "thermodynamic budget." Alternatively, if dry bulb temperature T2 is expected to violate the low temperature of operating limits 601 of the library, then the cooling can be reduced by selectively turning off one or both of cooling fans 191, 192, so that the library's own heat warms its internal air to be within operating limits 601. Equation 3 could model T2 with one or both cooling fans off to determine the better course of action to raise the dry bulb temperature T2.

Figure 7:
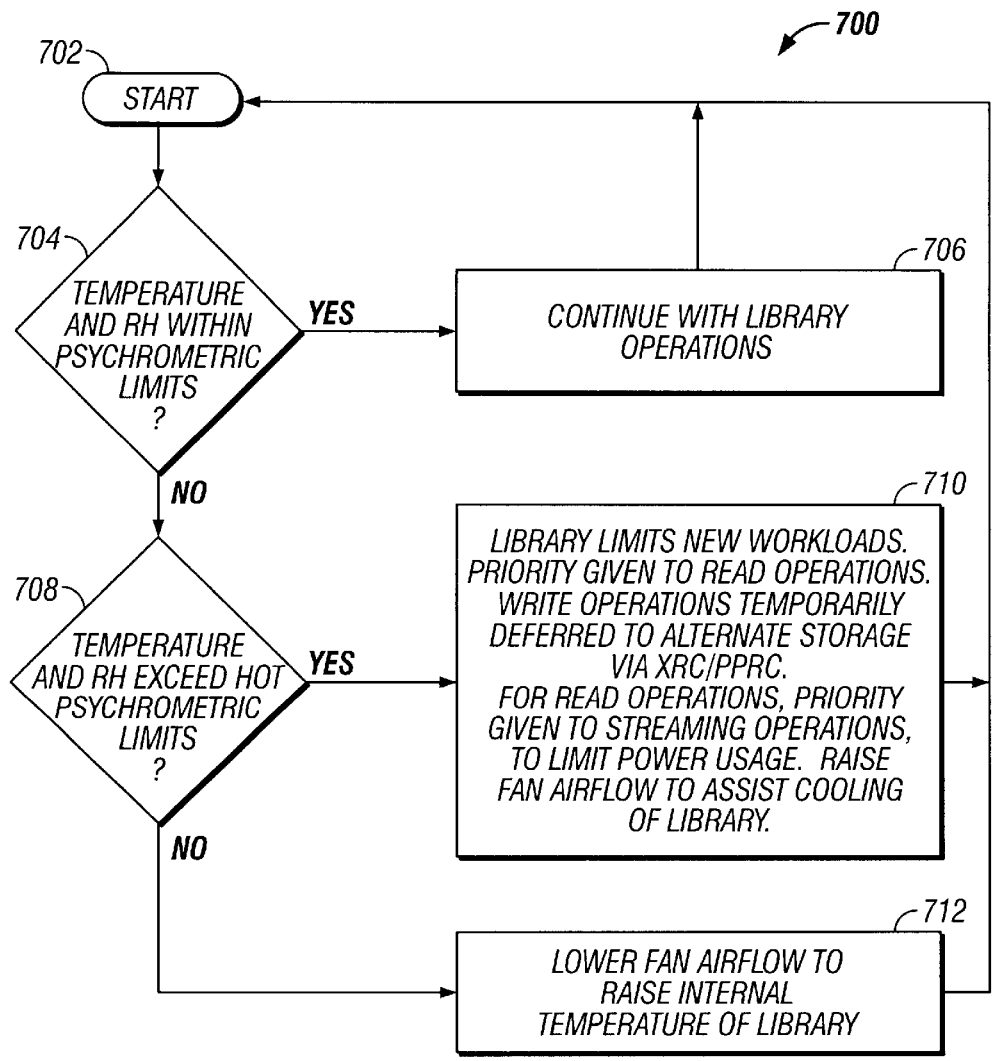
FIG. 7 is a flow chart depicting one embodiment of an operation of the present invention.

Referring now to FIG. 7, one example of a method and system 700 for controlling the internal temperature and relative humidity of a data storage and retrieval system 100 is shown. At a given current cooling and power consumption level, Equation 3 looks at future time t2 and predicts whether data storage and retrieval system 100 will remain within the operating constraints of range 601 of the psychrometric chart 600 (FIG. 6). As shown, range 601 is defined by a low dry bulb temperature 602 and a high dry bulb temperature 603, as well as a low relative humidity 604 and high relative humidity 605 to define the left and right as well as lower and upper boundaries. Also, range 601 typically has a wet bulb temperature cutoff 606 between high dry bulb temperature 603 and high relative humidity 605. The boundaries of operating range 601 are merely illustrative and are not intended to limit the invention in any manner or form.

Based on the thermal prediction of dry bulb temperature T2 of Equation 3, the actions shown in the flowchart of FIG. 7 are implemented. The predicted relative humidity at time t2 is estimated by extrapolating along a horizontal line of constant humidity ratio, along the right-hand side of FIG. 6, from the known dry bulb temperature T1 and relative humidity at time t1 to the predicted dry bulb temperature T2. For example, if at time t1 the dry bulb temperature T1 is 50 degrees F. and the relative humidity is 50%, and the value of dry bulb temperature T2 at future time t2 is 90 degrees F., then the predicted relative humidity at time t2 is only about 13%, which is out of range 601.

The algorithm begins as illustrated at block 702 (FIG. 7). A determination is made as to whether the environmental conditions of the system are currently within the acceptable psychrometric limits of region 601, as depicted at block 704. If the conditions are acceptable, the operations of the library are continued, as illustrated at block 706. If the conditions are not acceptable, a determination is made as to whether it is likely that the environmental conditions exceed the upper operating limits (e.g., excessive temperature), as depicted at block 708. If the environmental conditions are below the lower dry bulb temperature operating limits, the process continues by, for example, lowering fan airflow to increase the internal dry bulb temperature of data storage and retrieval system 100, as illustrated at block 712. Humidity may be injected into data storage and retrieval system 100 by a humidifier 510 (FIG. 5) to compensate for the subsequent heating of cold and dry air, so that the low relative humidity boundary 604 is not violated.

However, if the conditions include excessive temperature, data storage and retrieval system 100 may process streaming I/O and defer power hungry start-stop I/O to the tape drives in order to reduce the power consumption and accompanying heat generation within data storage and retrieval system 100, as depicted at block 710. In addition, hot and wet air can be dried by dehumidifier 511 if data storage and retrieval system 100 is being cooled in step 710. Also, the library may write many files to the same magnetic tape when power needs to be conserved for heat reasons, and then later distribute those files to the tape cartridges that are the final destinations, in order to limit picker activity.

In addition, the library may invoke remote copy functions, such as extended remote copy (XRC) and peer-to-peer remote copy (PPRC), and store the data in remote locations directly from cache, thereby avoiding storage of the data in the library until the library can support the electrical power to perform the I/O. Other remedial actions also maybe taken to avoid damage to the data and system. After actions are taken as depicted at blocks 710 and 712, the process continues this sequence at block 704. As stated above, the environmental records of the library, such as temperature and humidity readings, also are stored in a memory (RAM 163 in FIG. 5) for a significant period of time to aid in diagnosing and resolving field problems. Additionally, messages may be sent to the system administrator each time steps 706, 710, and 712 are entered. A suitable message protocol is SNMP (Simple Network Management Protocol). For example, if step 710 is entered, the SNMP message would state that the library was too hot; if step 712 is entered, the message would state that the library is too cold; and if step 706 is entered, the message would state that the environmental conditions with the library meet the operating limits 601 of FIG. 6.

The present invention has several advantages. The system and method constructed in accordance with the present invention anticipates the future environmental conditions of the data storage and retrieval system based on the queued workload. For example, if the temperature and humidity of the data storage and retrieval system were to violate the hot portion of its psychrometric specifications, the queued workload may be scanned and only those work items which would keep the temperature of the data storage and retrieval system within its psychrometric specifications would be executed. Also, the queue may be managed to not accept further work until the temperature and humidity fall within the psychrometric specifications. When precautions such as these are implemented, the risk of damage to the data stored on media is significantly reduced or eliminated.

Although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution.

What is claimed is:

1. A method of controlling environmental conditions in a data storage and retrieval system to enhance performance and reliability of the system, comprising:
   (a) providing a thermodynamic model of the system having environmental operating limits;
   (b) monitoring current environmental conditions entering the system;
   (c) monitoring current environmental conditions inside the system, the power consumed by the system, and the internal heat generated by the system;
   (d) monitoring current environmental conditions exiting the system;
   (e) processing the data collected in the previous steps and calculating future environmental conditions of the system in response thereto; and
   (f) if the future environmental conditions are expected to violate the environmental operating limits of the system based on a queued workload in the system, then automatically implementing predefined options to take corrective action within the system and thereby avoid violating the environmental operating limits of the system such that a risk of damage to the system and stored data is reduced or eliminated.

2. The method of claim 1 wherein the corrective action of step (f) includes decreasing a cooling rate of the system when a temperature of the system is expected to be too low, and selectively humidifying the system to prevent a relative humidity of the system from violating the environmental operating limits.

3. The method of claim 1 wherein the corrective action of step (f) includes increasing a cooling rate of the system when a temperature the system is expected to be too high, and selectively dehumidifying the system to prevent a relative humidity of the system from violating the environmental operating limits.

4. The method of claim 1 wherein the current environmental conditions of steps (b), (c), and (d) include a temperature, humidity, and flow rate of air entering, flowing through, and exiting the system.

5. The method of claim 1 wherein step (a) includes constructing the thermodynamic model with psychrometric data for an operating environment of the system, and a product of an effective thermodynamic mass and specific heat of the system.

6. The method of claim 1 wherein the predefined options of step (f) are selected from the group consisting of: increasing a cooling rate of the system, engaging supplemental cooling to provide additional ventilation for the system, reducing electrical heat generated within the system by reducing a work rate of the system, reducing the permitted I/O data rate of the system, performing multiple writes to one magnetic tape, and invoking temporary remote copy functions.

7. The method of claim 1 wherein the events of step (f) are communicated by the system to a host via a link selected from the group consisting of: a Gigabit Ethernet, Infiniband, TCP/IP, Fibre Channel, SCSI, ESCON, and a FICON.

8. The method of claim 1, further comprising the step of performing I/O with removable cartridges having media selected from the group consisting of: magnetic tape, optical tape, optical disk media, magneto-optical disk, CD, DVD, phase-change media, removable hard disk and floppy disk.

9. The method of claim 1, further comprising the step of sending a message to a system administrator to report information accumulated by the system in response to any of steps (b) through (f).

10. The method of claim 1, further comprising the step of calibrating the system for the product of a mass of the system and a specific heat of the system.

11. A data storage and retrieval system, comprising:
    a storage wall having a plurality of removable media cartridges;
    an I/O device for performing I/O with respect to the removable media cartridges;
    a robotic picker for moving the removable media cartridges between the storage wall and the I/O device;
    an operator access station for permitting a user to communicate directly with the data storage and retrieval system;
    a power component for supplying power to the data storage and retrieval system;
    cooling fans for circulating ventilating air into, through, and out of the data storage and retrieval system;
    environmental sensing devices located in the data storage and retrieval system for measuring environmental conditions of the air flowing into, passing through, and exiting the data storage and retrieval system;
    a controller having an upper interface for allowing the data storage and retrieval system to communicate with a host via a link, a lower interface for communicating with the I/O device, and a thermodynamic model of the system including environmental operating limits of the system; and wherein
      the controller monitors the environmental conditions, power consumed and heat generated by the data storage and retrieval system, and calculates future environmental conditions of the system in response thereto, such that if the future environmental conditions are expected to violate the environmental operating limits of the system based on a queued workload in the system, predefined options are automatically implemented to take corrective action within the system and thereby avoid violating the environmental operating limits of the system and a risk of damage to the system and stored data in the removable media cartridges.

12. The data storage and retrieval system of claim 9 wherein the corrective action includes decreasing a throughput of the cooling fans when a temperature of the system is expected to be too low, and selectively humidifying the system with a humidifier to prevent a relative humidity of the system from violating the environmental operating limits.

13. The data storage and retrieval system of claim 11 wherein the corrective action includes increasing a throughput of the cooling fans when a temperature the system is expected to be too high, and selectively dehumidifying the system with a dehumidifier to prevent a relative humidity of the system from violating the environmental operating limits.

14. The data storage and retrieval system of claim 11 wherein the environmental sensing devices include data-acquisition circuitry having a microprocessor for performing calculations, ROM for storing psychrometric data, RAM for storing thermodynamic input from the environmental sensing devices, including thermometers and hygrometers, which sample air throughout the system including an air intake and air exhaust.

15. The data storage and retrieval system of claim 11 wherein the current environmental conditions include measurements of a temperature, humidity, and flow rate of air entering, flowing through, and exiting, respectively, the system.

16. The data storage and retrieval system of claim 11 wherein the thermodynamic model includes psychrometric data for an operating environment of the system, and a product of an effective thermodynamic mass and specific heat of the system.

17. The data storage and retrieval system of claim 11 wherein the predefined options selectable by the controller are selected from the group consisting of: increasing a cooling rate of the system, engaging supplemental cooling to provide additional ventilation for the system, reducing electrical heat generated within the system by reducing a work rate of the system, reducing the permitted I/O data rate of the system, performing multiple writes to one magnetic tape, and invoking temporary remote copy functions.

18. The data storage and retrieval system of claim 11 wherein the link for the controller is selected from the group consisting of: a Gigabit Ethernet, Infiniband, TCP/IP, Fibre Channel, SCSI, ESCON, and a FICON.

19. The data storage and retrieval system of claim 11 wherein the removable media cartridges are selected from the group consisting of: magnetic tape, optical tape, optical disk media, magneto-optical disk, CD, DVD, phase-change media, removable hard disk and floppy disk.

20. The data storage and retrieval system of claim 11 wherein the controller samples the voltage-current (VI) product of the power component to make calculations for the future environmental conditions.

21. The data storage and retrieval system of claim 11 wherein the controller sends a message to a system administrator to report information accumulated by the system.

22. A computer program product, residing on a computer usable medium and having computer usable program means embodied therein, the computer program means comprising:

means for providing a thermodynamic model of a system having environmental operating limits;

means for monitoring current environmental conditions entering the system;

means for monitoring current environmental conditions inside the system, power consumed by the system, and internal heat generated by the system;

means for monitoring current environmental conditions exiting the system;

means for processing the data collected in the previous steps and calculating future environmental conditions of the system in response thereto; and means for automatically implementing predefined options to take corrective action within the system and thereby avoid violating the environmental operating limits of the system such that a risk of damage to the system and stored data is reduced or eliminated, if the future environmental conditions are expected to violate the environmental operating limits of the system based on a queued workload in the system.

23. The computer program product of claim 22 wherein the means for automatically implementing predefined options decreases a cooling rate of the system when a temperature of the system is expected to be too low, and selectively humidifying the system to prevent a relative humidity of the system from violating the environmental operating limits.

24. The computer program product of claim 22 wherein the means for automatically implementing predefined options increases a cooling rate of the system when a temperature the system is expected to be too high, and selectively dehumidifying the system to prevent a relative humidity of the system from violating the environmental operating limits.

25. The computer program product of claim 22 wherein the means for monitoring include measuring a temperature, humidity, and flow rate of air entering, flowing through, and exiting the system.

26. The computer program product of claim 22 wherein means for providing includes constructing the thermodynamic model with psychrometric data for an operating environment of the system, and a product of an effective thermodynamic mass and specific heat of the system.

27. The computer program product of claim 22 wherein the means for automatically implementing predefined options is selected from the group consisting of: increasing a cooling rate of the system, engaging supplemental cooling to provide additional ventilation for the system, reducing electrical heat generated within the system by reducing a work rate of the system, reducing the permitted I/O data rate of the system, performing multiple writes to one magnetic tape, and invoking temporary remote copy functions.

28. The computer program product of claim 22, further comprising means for sending a message to a system administrator to report information accumulated by the system.

* * * * *